United States Patent Office 3,294,787 Patented Dec. 27, 1966

3,294,787

HYDRAZONES OF 1-AMINO-4-DIPHENYL-PROPENYLPIPERAZINES

John W. Cusic, Skokie, and Peter Yonan, Chicago, Ill., assignors to G. D. Searle & Co., Chicago, Ill., a corporation of Delaware No Drawing. Filed Apr. 21, 1964, Ser. No. 361,564
4 Claims. (Cl. 260—240)

The present invention relates to a group of compounds which are hydrazone derivatives of 1-amino-4-diphenylpropenylpiperazines. In particular, the compounds involved in the present invention can be represented by the following general formula

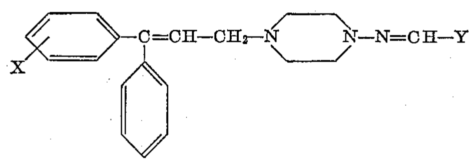

wherein X is selected from the group consisting of hydrogen and halogen and Y is selected from the group consisting of phenyl, tolyl, halophenyl, hydroxyphenyl, methoxyphenyl, methylenedioxyphenyl, cyanophenyl, and pyridyl.

The halogen radicals referred to above include fluorine, chlorine, bromine, and iodine. The halophenyl radicals referred to above include fluorophenyl, chlorophenyl, bromophenyl, and iodophenyl.

The organic bases of this invention form pharmaceutically acceptable, non-toxic, acid addition salts with a variety of organic and inorganic acids. Such salts are formed with acids such as sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids.

The compounds of this invention can be prepared by the condensation of the appropriate aldehyde with a 1-substituted 4-aminopiperazine in an inert solvent. A trace of acetic acid can be included to catalyze the reaction. Although 2-propanol is a particularly useful solvent for the reaction, ethanol or other alcohols can also be used. In addition, aromatic hydrocarbons such as benzene or toluene are useful as solvents in this type of reaction although, when these solvents are used, it is desirable to remove the water from the reaction mixture as it is formed. The reaction is further promoted by the use of elevated temperatures.

The compounds of this invention are useful because of their pharmacological properties. In particular, the present compounds possess anti-ulcer activity which is demonstrated by the inhibition of ulceration in the Shay rat. The present compounds also possess anti-inflammatory activity. This is demonstrated by their phenylbutazone-like effect on edematous condition. Furthermore, the compounds of this invention posses anti-hypertensive activity. They also possess antibiotic activity against a wide variety of organisms. Thus, they inhibit the growth of the bacteria *Diplococcus pneumoniae,* the protozoa *Tetrahymena gelleii,* and the alga *Chlorella vulgaris.* Those compounds where Y is pyridyl are particularly preferred.

The 1-amino-4-diphenylpropenylpiperazines, which are useful intermediates in the preparation of the hydrazones of the present invention, also possess anti-inflammatory and anti-biotic properties in common with these hydrazones.

The following examples are presented to further illustrate the present invention; they should not be construed as limiting it in spirit or in scope. In these examples, quantities are indicated in parts by weight and temperatures in degrees centigrade (° C.).

*Example 1*

To a refluxing mixture of 20 parts of 1-nitrosopiperazine, 40 parts of potassium carbonate, and 7 parts of sodium iodide in 280 parts of 2-butanone is added portionwise over a period of 1 hour 37 parts of 3-chloro-1,1-diphenyl-1-propene. The resultant mixture is refluxed for 15 hours and then filtered to remove inorganic salts. The solvent is evaporated from the filtrate and the residue is dissolved in ether and washed with water. The other solution is then extracted with dilute hydrochloric acid and the acid extract is made alkaline with ammonium hydroxide. The resultant mixture is then extracted with ether and the ether extract is dried and filtered. The solvent is evaporated from this filtrate to leave a residual oil which is 1-nitroso-4-(3,3-diphenylallyl)piperazine.

A solution of 25 parts of 1-nitroso-4-(3,3-diphenylallyl) piperazine in 105 parts of dry ether is added portionwise to a suspension of 7 parts of lithium aluminum hydride in 700 parts of dry ether. The resultant mixture is then refluxed for 2 hours, cooled in an ice bath, and decomposed by the cautious addition of water. The mixture is filtered to remove the inorganic salts and the solvent is evaporated from the ether solution to leave a residual oil. An ethanol solution of this oil is mixed with an ethanol solution of excess maleic to give a precipitate of the dimaleate salt of 1-amino-4-(3,3-diphenylallyl)piperazine. This salt melts at about 172–173° C. The free base has the following formula

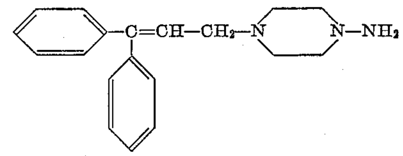

If an equivalent quantity of 3-chloro-1-(4-chlorophenyl)-1-phenylpropene obtained from the allylic chlorination of 1-(4-chlorophenyl)-1-phenylpropene is substituted for the 3-chloro-1,1-diphenylpropene and the above procedure is repeated, the product is 1-amino-4-[3-(4-chlorophenyl)-3-phenylallyl]piperazine.

*Example 2*

A mixture of 3 parts of 1-amino-4-(3,3-diphenylallyl) piperazine and 1.7 parts of benzaldehyde in 32 parts of 2-propanol and 1 drop of glacial acetic acid is boiled for about 5 minutes. The resultant solution is then cooled and filtered to give 1-benzylidene-amino-4-(3,3-diphenylallyl)piperazine melting at about 124–125° C.

If an equivalent quantity of 1-amino-4-[3-(3-chlorophenyl)-3-phenylallyl]piperazine is substituted for the 1-amino-4-(3,3-diphenylallyl)piperazine and the above procedure is repeated, the product is 1-benzylidene-amino-4 - [3 - (4 - chlorophenyl) - 3 - phenylallyl]piperazine. This compound has the following formula

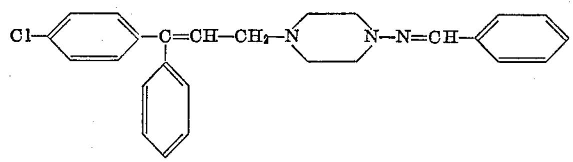

*Example 3*

If equivalent quantities of 4-hydroxybenzaldehyde and piperonal are each substituted for the benzaldehyde and the procedure of Example 2 is repeated, the products obtained are, respectively, 1-(4-hydroxybenzylideneamino)-4-(3,3-diphenylallyl)piperazine and 1-piperonylideneamino-4-(3,3-diphenylallyl)piperazine. The latter compound melts at about 136–138° C.

*Example 4*

Equivalent quantities of pyridine-3-carboxaldehyde and pyridine-4-carboxaldehyde are each substituted for the benzaldehyde and the procedure of Example 2 is repeated. In this case, the crude product is dissolved in ethanol and mixed with an ethanol solution of excess maleic acid to give the corresponding dimaleate salt. The specific products obtained are, respectively, the dimaleate salt of 1-(3-pyridylmethyleneamino)-4-(3,3-diphenylallyl)piperazine and the dimaleate salt of 1-(4-pyridylmethyleneamino)-4-(3,3-diphenylallyl)piperazine melting at about 147–148° C. The free base of the second compound has the following formula

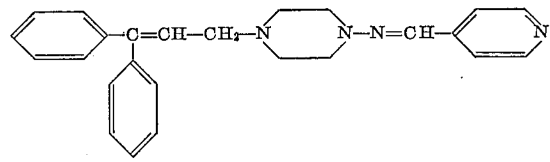

What is claimed is:

1. A compound of the formula

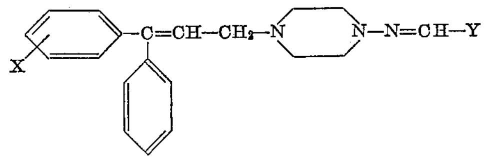

wherein X is selected from the group consisting of hydrogen and halogen and Y is selected from the group consisting of phenyl, hydroxyphenyl, methylenedioxyphenyl, and pyridyl.

2. A compound of the formula

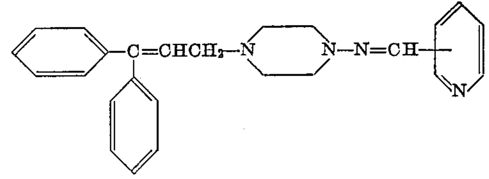

3. 1-(4-pyridylmethyleneamino)-4-(3,3-diphenylallyl)-piperazine.

4. 1-amino-4-(3,3-diphenylallyl)piperazine.

References Cited by the Examiner

UNITED STATES PATENTS 3,178,422 4/1965 Cusic ............ 260—240

JOHN D. RANDOLPH, *Primary Examiner.*

UNITED STATES PATENT OFFICE

CERTIFICATE OF CORRECTION

Patent No. 3,294,787 December 27, 1966

John W. Cusic et al.

It is hereby certified that error appears in the above numbered patent requiring correction and that the said Letters Patent should read as corrected below.

Column 1, line 59, for "posses" read -- possess --; column 2, line 12, for "other" read -- ether --; line 28, for "maleic to" read -- maleic acid to --.

Signed and sealed this 7th day of November 1967.

(SEAL)

Attest:

Edward M. Fletcher, Jr.

Attesting Officer

EDWARD J. BRENNER

Commissioner of Patents